United States Patent [19]
Radkowsky et al.

[11] 3,859,165
[45] Jan. 7, 1975

[54] EPITHERMAL TO INTERMEDIATE SPECTRUM PRESSURIZED HEAVY WATER BREEDER REACTOR

[75] Inventors: Alvin Radkowsky, Tel Aviv, Israel; George Henry Conley, Pittsburgh, Pa.; Henry Wesley Ryals, Bethel Park, Pa.; John Nils Hanson; Joseph David Cohen, both of Pittsburgh, Pa.; William Arthur Weinreich, III, Bethel Park, Pa.

[73] Assignee: The United States of America as represented by the United States Atomic Energy Commission, Washington, D.C.

[22] Filed: Oct. 13, 1972

[21] Appl. No.: 297,545

Related U.S. Application Data

[63] Continuation-in-part of Ser. No. 59,171, July 29, 1970, abandoned.

[52] U.S. Cl. .................................. 176/18, 176/40
[51] Int. Cl. ........................................... G21c 1/00
[58] Field of Search............ 176/17, 18, 205 SC, 40

[56] References Cited
UNITED STATES PATENTS

| | | | |
|---|---|---|---|
| 2,992,174 | 7/1961 | Edlund et al. ....................... | 176/18 |
| 3,143,478 | 8/1964 | Chernick et al. .................... | 176/18 |
| 3,197,376 | 5/1965 | Balent et al. ........................ | 176/18 |
| 3,247,068 | 4/1966 | Schluderberg et al. ............. | 176/18 |
| 3,252,867 | 5/1966 | Conley................................. | 176/18 |
| 3,351,532 | 11/1967 | Rabb, Jr. et al. ................... | 176/17 |
| 3,379,615 | 4/1968 | Halliday............................... | 176/18 |

OTHER PUBLICATIONS

"Hearings Before the Joint Committee on Atomic Energy, Congress of the United States," First Session on Naval Nuclear Propulsion Program, Apr. 23, 1969, pp. 199, 200, 202, 205, 206, 207, 210, 211, 222, 223.

*Primary Examiner*—Harvey E. Behrend
*Attorney, Agent, or Firm*—Kenneth L. Cage; John A. Horan

[57] ABSTRACT

A pressurized heavy water moderated nuclear reactor having an epithermal to intermediate neutron spectrum is provided which is characterized by an improved breeding ratio in comparison with previously existing pressurized heavy water moderated reactors. The neutron spectrum having an energy distribution between those of fast and thermal reactors results from the restriction of the moderator-to-fuel atom ratio to range from 0.35 to 4.0. Three pressurized heavy water reactor designs using the inventive moderator-to-fuel atom ratio range are described: two with a uniform lattice configuration and one with a seed-blanket arrangement.

2 Claims, 10 Drawing Figures

EPITHERMAL TO INTERMEDIATE SPECTRUM PRESSURIZED HEAVY WATER BREEDER REACTOR

BACKGROUND OF THE INVENTION

This application is a continuation-in-part of U.S. Patent Application Ser. No. 59,171(70) filed by A. Radkowsky et al., on July 29, 1970, now abandoned. This invention was made in the course of, or under, a contract with the U.S. Atomic Energy Commission.

FIELD OF THE INVENTION

The invention described herein relates generally to nuclear reactors and more particularly to a pressurized heavy water moderated and cooled, epithermal to intermediate spectrum, nuclear breeder reactor.

DESCRIPTION OF THE PRIOR ART

U.S. Pat. No. 2,708,656 issued to E. Fermi et al. on May 17, 1955 describes physics principles applicable to nuclear reactors. U.S. Pat. No. 2,832,733 issued to L. Szilard on April 29, 1958 describes physics principles applicable to heavy water moderated reactors. "Nuclear Reactor Engineering," by Samuel Gladstone and Alexander Sesonske, prepared under the auspices of the Division of Technical Information, U.S. Atomic Energy Commission, Van Nostrand Reinhold Company (1967), describes general terminology used in this specification. The "Nuclear Engineering Handbook," edited by H. Etherington, first Edition, McGraw-Hill Book Company (1967) describes the mechanical design and operation of Reactors.

For clarity and precision, specific terminology used in this specification is defined as follows:

Active Core: The central portion of a nuclear reactor which contains fissile and fertile material and in which the fission chain is sustained and most of the energy of fission is released as heat.

Blanket Region: An active core region immediately surrounding the seed region containing predominantly fertile material and characterized by conversion of the fertile material into fissile material by neutron capture.

Breeder Reactor: A nuclear reactor which produces a fissile material to replace that used to maintain the fission chain. Further limited herein to nuclear reactors which produce more fissile material than they consume.

Breeding Ratio: The ratio of the number of fissile atoms produced to the number of fissile atoms that have been consumed.

Conversion Ratio: The ratio of the instantaneous rate of production of fissile atoms to the instantaneous rate of destruction of fissile atoms.

Doubling Time: The time required for a breeder reactor to produce a surplus amount of fissile material equal to that required for the initial charge of inventory of the reactor, after accounting for reprocessing and refabrication losses.

Epithermal Reactor: A nuclear reactor characterized by a neutron energy spectrum in which more than half of the fissions result from the absorption of neutrons having energies above 0.6 electron volts (0.6 ev) and a moderating power per fissile atom ($\xi\Sigma_s/NU$) less than 1000.

Fast Reactor: A nuclear reactor characterized by a neutron energy spectrum in which more than half of the fissions result from the absorption of neutrons having energies greater than 200,000 electron volts (0.2 Mev) and a moderating power per fissile atom ($\xi\Sigma_s/NU$) less than 10.

Fertile Material: Material which can be converted into fissile material through neutron capture; for example thorium-232 and uranium-238 fertile materials are converted respectively to uranium-233 and plutonium-239 fissile material.

Fissile Material: Material which will undergo fissions with neutrons of all energies; including thermal to fast neutrons; for example uranium-233, uranium-235 and plutonium-239.

Fuel: Designates either fissile or fertile material or a combination of both.

Intermediate Reactor: A nuclear reactor characterized by a neutron spectrum in which more than half of the fissions result from the absorption of neutrons having energies above 3,000 electron volts (3 kev) and a moderating power per fissile atom ($\xi\Sigma_s/NU$) less than 200.

Module: One of a plurality of fuel units comprising an active core region.

Module Geometry: The geometrical configuration of a nuclear reactor having modules dependently nuclearly coupled to form an active core.

Movable Region: An active core fuel region disposed for longitudinal movement, in reference to a stationary fuel region during normal reactor operation.

Seed Region: An active core region containing substantial fissile material and characterized by neutron leakage to a blanket region.

Stationary Region: An active core fuel region which remains fixed during normal reactor operation.

Thermal Reactor: A nuclear reactor characterized by a neutron spectrum in which more than half of the fissions result from the absorption of neutrons having a substantially Maxwellian number-energy distribution about an energy value equal to $KT$, where $K$ is a constant and $T$ is the reactor temperature in degrees Kelvin and a moderating power per fissile atom ($\xi\Sigma_s/NU$) greater than 1,000. In such a reactor, more than half of the fissions result from the absorption of neutrons having neutron energies below 0.6 electron volts (0.6 ev).

Variable Geometry Control: A means of reactivity control by axially positioning a movable region with respect to a stationary region and thereby changing the leakage of neutrons from the movable region to the stationary region.

To satisfy the nation's energy requirements over the long term through efficient utilization of our natural resources requires the development and use of a class of nuclear reactors which have been designated breeder reactors. Such reactors convert fertile material to fissile material during operation in addition to providing heat for such things as power generation, desalination or chemical processing. By effecting such conversion, the reserves of economically available nuclear fuel feed material can be extended almost indefinitely.

In developing breeder reactors, although not essential to high fuel utilization, it is desirable to achieve short doubling times. Doubling times may be shortened by reducing parasitic absorption of neutrons in nonfissile and nonfertile material such as core structural material, cladding, moderator, and fission products; by reducing neutron leakage of neutrons from the reactor core; and by providing a fissile fuel and a neutron energy spectrum wherein the maximum number of neutrons is liberated per average fission. Neutron spectra which are slightly harder or of slightly higher characteristic energy than "thermal" typically provide a smaller number of neutrons per fissile atom destroyed than thermal spectra, while neutron spectra having very much higher characteristic energy, such as sodium cooled fast reactors, utilize the fast fission of U-238 to provide a greater number of neutrons per fissile atom destroyed. However, sodium cooled reactors need extensive development in materials due to elevated pressures and temperatures inherent in such a system.

Both pressurized light and heavy water moderated and cooled breeder reactors are highly attractive from an engineering standpoint because of the availability of the extensive pressurized water technology which has already been developed in the nuclear power field. As the neutron spectrum is hardened in an uranium-233 fueled light water breeder reactor, the conversion ratio steadily increases from a thermal value of 0.8 at a moderator-to-fuel atom ratio greater than 7 to a value of about 1.06 at a moderator-to-fuel atom ratio of 1.0. This conversion ratio increase is due to a reduction in parasitic neutron absorption in the moderator and structural material more than compensating for a decrease in eta ($\eta$) in the higher energy neutron spectra. However, light water breeders provide only a sufficient breeding margin to permit self-sustained operation with very long doubling times.

Heavy water is also attractive from a breeding standpoint because of its low parasitic neutron absorption. Heretofore, heavy water moderated converter reactors have been restricted to designs characterized by very thermal neutron spectra. Contrary to light water studies, heavy water reactors studies have indicated that conversion ratio and breeding performance worsened as the very thermal neutron spectra as defined by a high moderator-to-fuel atom ratio was hardened toward the epithermal as defined by a lower moderator-to-fuel atom ratio ($M/F$ atom ratio). HeavyWater Reactor Review and Prospect, W. Bennett Lewis, Transactions of American Nuclear Society, 8:85; May 1965; $D_2O$ Reactors for Breeding with Th, Nucleonics 22 1964 lt., p. 54; Breeding Ratio in U-235 and Pu-239 Fueled Reactors, Nuclear Science Engineering 7 (1960) p. 545; Breeding Potential of U-233 Systems, BNL 4261. The result is best understood by noting the conversion ratio is approximately equal to $\eta\epsilon$ minus 1.0 minus parasitic neutron losses, where $\eta\epsilon$ is the product of the number of fast neutrons produced per thermal neutron absorption in fuel times the fast fission factor. At high $M/F$ atom ratios, $\eta\epsilon$ is relatively high and there is very little loss from heavy water neutron absorption. As the $M/F$ atom ratio was reduced, the expected conversion ratio improvement due to reduced parasitic losses in structure were more than compensated for by a corresponding rapid reduction of $\eta\epsilon$ which yielded a decreased conversion ratio. In view of this prior art, heavy water moderated and cooled converters were thus considered useful only in the thermal region. A pressurized heavy water moderated converter reactor which operates with a thermal neutron spectrum requires a wide lattice spacing to gain sufficient moderation because of the low moderating power of heavy water. This spacing requirement causes the core size to be very large, thereby causing problems in providing suitable pressure vessels and increasing the capital costs associated with maintaining large heavy water inventories.

SUMMARY OF THE INVENTION

It is, accordingly, a general object of the invention to provide a pressurized heavy water moderated and cooled nuclear reactor design of compact size which is characterized by a favorable breeding ratio.

It is a further object of the invention to provide a pressurized heavy water moderated and cooled reactor having an epithermal to intermediate neutron spectrum with an increased conversion ratio.

It is a further object of this invention to provide a breeder reactor characterized by a favorable breeding ratio utilizing pressurized water technology.

Other objects of the invention will become apparent upon examination of the following description in conjunction with the appended drawings.

In accordance with the invention, a pressurized heavy water moderated and cooled nuclear reactor having an active core with fissile and fertile material is provided which operates from an epithermal to intermediate neutron spectrum as defined by the restriction of the moderator-to-fuel atom ratio range from 0.35 to 4.0. An unexpected favorable breeding ratio occurs in a reactor operating within this moderator-to-fuel atom ratio range heretofore believed to produce a less favorable breeding ratio as evidenced with prior art heavy water moderated converter reactors. Reactor designs having a particular fuel rod diameter and spacing within the restrictive moderator-to-fuel atom ratio range define representative embodiments of the inventive pressurized heavy water breeder reactor.

DESCRIPTION OF THE PREFERRED EMBODIMENTS

The initial conversion ratio is defined as the beginning of life value of the ratio of the rate of production of fissile material to the rate of destruction or "burning up" of fissile material. Hence a conversion ratio of one exists when production of fissile material from fertile material just matches the "burning up" of fissile material. To ensure criticality and satisfactory breeding performance of the reactor, the atom ratio of fertile to fissile material should be within a range from 5 to 50.

As noted above, both light and heavy water moderated reactors are considered to have attractive breeder capabilites. Our studies on uranium-233 fueled reactors have determined characteristic intermediate neutron spectra ($\xi\Sigma_s/NU<200$) for both a light water breeder reactor (LWBR) and heavy water breeder reactor (HWBR). These studies indicated that the largest fraction of neutron absorptions per energy group in the LWBR occurs between 0–0.625 whereas the HWBR has the largest fraction of neutron absorptions between 0.625–5,500 ev.

A summary of studies is presented in Table I.

TABLE I

FRACTIONAL NEUTRON ABSORPTIONS BY ENERGY

| GROUP | ENERGY RANGE | LWBR | HWBR |
|---|---|---|---|
| 1 | .821 – 10 mev. | .027 | .046 |
| 2 | 5.5 – 821 Kev. | .081 | .372 |
| 3 | .625 – 5500 ev. | .442 | .563 |
| 4 | 0 – .625 ev. | .450 | .019 |

Furthermore, comparing the HWBR to the LWBR, we noted that group 3 resonance region absorptions have increased by 30 percent and group 2 absorptions by a factor over 4.5. Thus, our studies set forth clear distinctions between the range of fractional neutron absorptions by energy for heavy and light water breeder reactors having an intermediate neutron spectrum.

Figure 1:
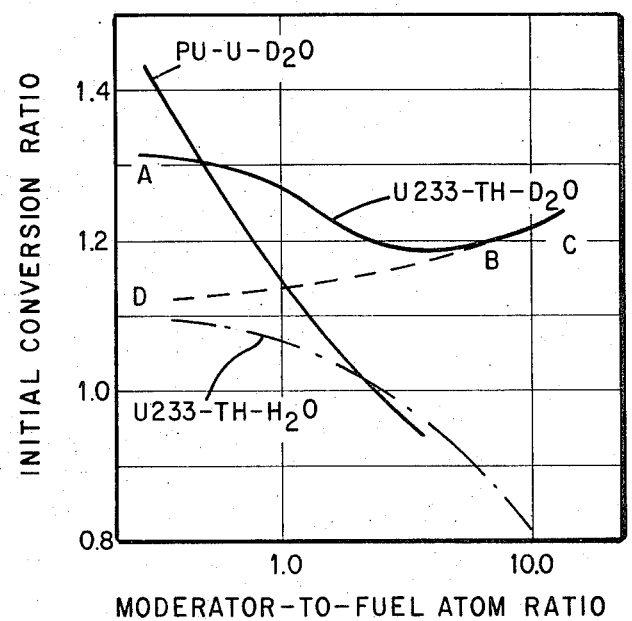
FIG. 1 is a graph showing the initial conversion ratio as a function of moderator-to-fuel ratio for a light water uranium-233 moderated and cooled reactor and for both plutonium-239 and uranium-233 fueled pressurized heavy water moderated and cooled reactors made in accordance with the invention.

To further illustrate features of the present invention, reference is made to FIG. 1 of the drawings where the initial conversion ratio is plotted as a function of moderator-to-fuel atom ratio for a U-233-TH-H$_2$O system. It is carefully pointed out that due to the greater moderating power of light water, a particular moderator-to-fuel atom ratio in a H$_2$O system defining a particular neutron spectrum would not correspond to the neutron spectrum in a D$_2$O system having the same M/F atom ratio. For clarity and precision, we will use M/F atom ratio as a comparative index rather than characteristic neutron spectrum since M/F atom ratio defines a precise physical composition. It can be seen for the U-233-TH-H$_2$O system the conversion ratio increases from about 0.8 at a 10 M/F atom ratio to about 1.1 at a 0.35 M/F atom ratio. This increased conversion ratio is mainly achieved by the reduction in parasitic absorption in the moderator and core structural material.

However, as cited above, experimenters have heretofore been of the opinion that the conversion ratio of a U-233-Th-D$_2$O system, as defined by line segment B–C at M/F atom ratios between 10.0 to about 4.0, continued to decline as the moderator-to-fuel atom ratio was further decreased below 4.0. This assumed conversion ratio decline can best be understood by extrapolating the path of the line segment B–C for M/F atom ratio values less than 4 as indicated by dotted line segment D–B. In addition, at very low M/F atom ratios, it was though to be impractical to achieve adequate heat removal. It was believed that the rapid drop in $\eta\epsilon$ in these M/F atom ratios failed to effectively utilize reduced parasitic losses which resulted in a reduced conversion ratio.

Applicants, however, have discovered an unexpected increase in the initial conversion ratio of uranium-233 fueled reactors containing thorium for breeding and heavy water moderator and coolant when the dueterium-to-fuel atom ratio is decreased only to the range from 4.0 to 0.35. The initial conversion ratio for a U-233-Th-D$_2$O system covering the M/F atom ratio within the range of the invention is defined along line segment A–B as the neutron spectrum changes from an epithermal spectrum at 4.0 to an intermediate spectrum of M/F ratios less than 1.0. This result can best be understood by again noting the effect $\eta\epsilon$ and parasitic losses have on conversion ratio. At a M/F atom ratio of about 4, we noted parasitic losses continued to rapidly decline whereas $\eta\epsilon$ was declining at less rapid rate. This trend continues for M/F atom ratios less than 4 and greater than 0.35. Hence, for M/F atom ratios from 4.0 to 0.35, the relatively slower decline of $\eta\epsilon$ as compared to the continued rapid decline of parasitic losses yields an increased conversion ratio.

FIG. 1 also illustrates the conversion ratio of a plutonium-uranium pressurized heavy water reactor which also increases rapidly as the M/F atom ratio is shifted from 4.0 to 0.35. The preferred M/F atom ratio for a plutonium-239 system is from 2.0, where the breeding ratio is greater than 1.0, to 0.35.

Figure 2:
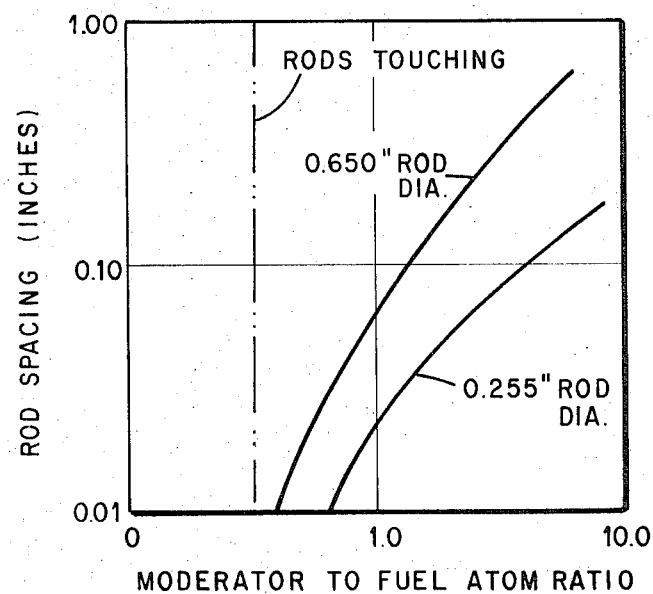
FIG. 2 is a graph showing rod spacing as a function of moderator-to-fuel ratio for fuel rods having different diameters in a pressurized heavy water breeder reactor.

FIG. 2 shows the effects of fuel rod diameter and spacing on the moderator-to-fuel atom ratio for infinite lattices of fuel rods arrnaged in a triangular pitch array. A rod spacing 0.070 in. is seen to provide a range of moderator-to-fuel ratios from 1.0 to 2.5 with fuel rod diameters varying between 0.650 and 0.255 inches. Thus, a reactor made in accordance with the present invention could be designed with a M/F atom ratio well within the limits of the permissible M/F atom ratios as taught by applicants. Typically, rod diameters could range from 0.200 inches to 0.750 inches diameter at a triangular pitch spacing from 0.020 to 0.095 inches with a preferred rod diameter range from 0.250 inches to 0.650 inches and pitch spacing from 0.055 to 0.095 inches. It is noted that although both may be utilized, cylindrical fuel rods permit greater fuel inventory in a given volume than fuel plates.

As the selection of a desired moderator-to-fuel atom ratio defines volume of coolant per unit mass of fuel, it is necessary to circulate heavy water moderator by the rods at a flow rate sufficient to provide adequate cooling thereof. Further thermal and hydraulic data on particular reactor designs is presented in TABLE IV.

A breeder reactor constructed in accordance with the above design limitations has certain advantages over other breeder reactor systems including:

1. The ability to use the advanced technology associated with pressurized water moderated and cooled reactors including materials well developed to operate at pressures from 1,500 psia to 2,500 psia and temperatures from 450°F to 650°F;
2. Reasonably short and practical doubling times;
3. A more compact overall size than is possible with heavy water moderated reactors which operate with thermal neutron spectra;
4. A lower sensitivity to neutron poisons than reactors which operate with thermal neutron spectra because of the typically lower absorption cross sections of most structural materials at neutron energy levels above thermal;

5. An inherent self-shutdown capability due to the moderating coolant and fuel Doppler characteristics;
6. Reasonable reactor lifetimes between refuelings; and
7. The ability to operate at a power density characteristic of economic nuclear reactors.

The basic advantages and design limitations of the invention have been illustrated in FIGS. 1 and 2 without reference to particular reactor designs. Although the invention is not intended to be limited to particular fuel element configurations, reactor core designs or reactivity control methods, a preferred reactor design using module geometry and variable geometry control is described in FIG. 3 and 4 to further illustrate operating characteristics and advantages of the invention. U.S. Pat. No. 3,351,531 issued to H. F. Raab, Jr. et al. on Nov. 7, 1967 describes a reactor using variable geometry control.

Figure 3:
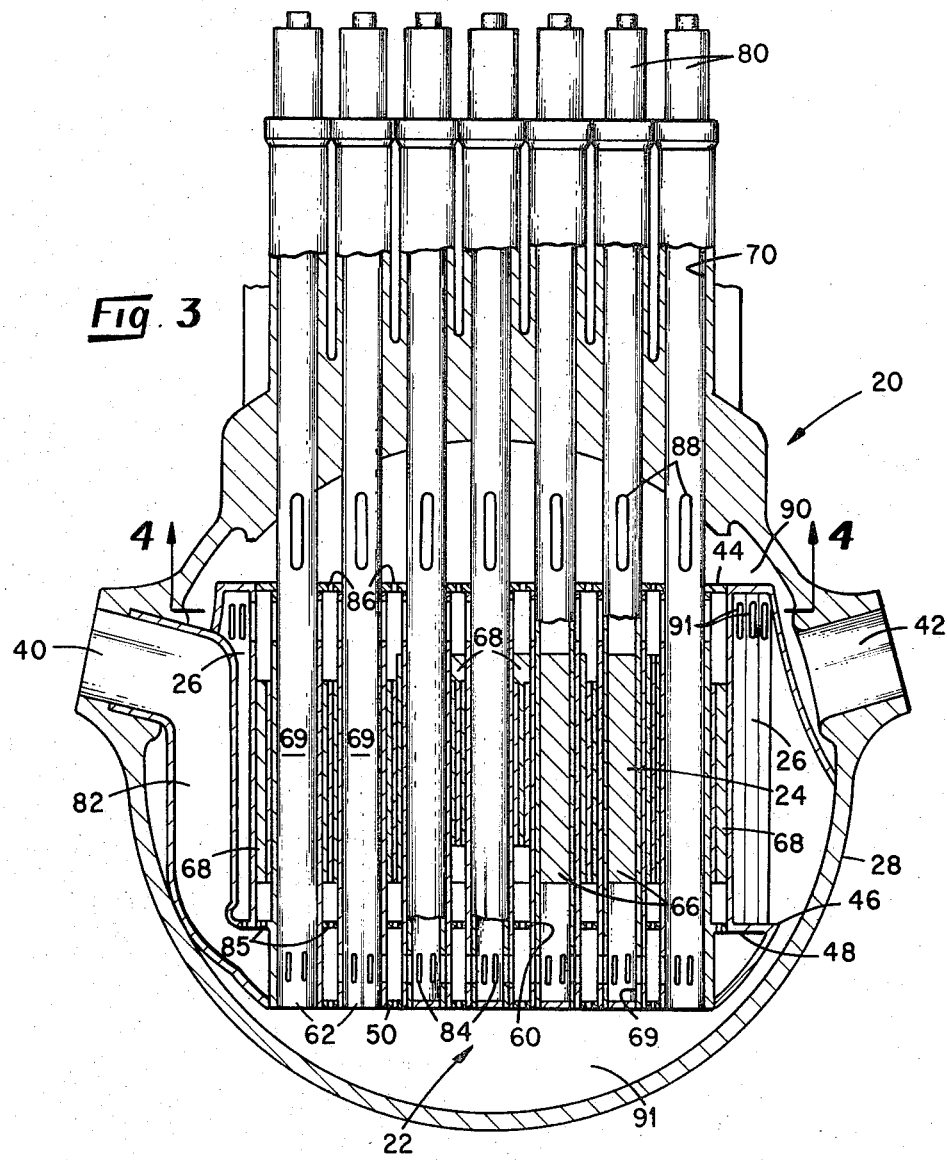
FIG. 3 is a vertical cross sectional view of a pressurized heavy water reactor having module geometry made in accordance with the present invention.
Figure 4:
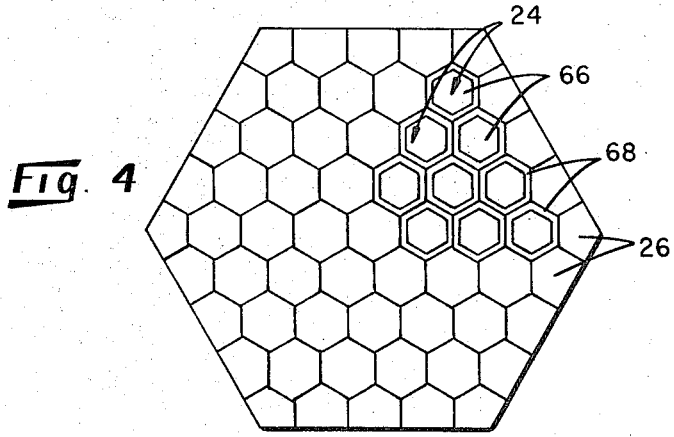
FIG. 4 is a horizontal cross sectional view along line 4—4 of FIG. 3.

Referring to FIGS. 3 and 4 a reactor 20 having an active core 22 comprises a plurality of fuel modules 24 surrounded by reflector assemblies 26. The reactor core 22 is positioned within a spherically shaped pressure vessel 28 having coolant inlet and outlet flow nozzles 40 and 42 formed therein. The core 22 is fixedly positioned in vessel 28 between an upper core support plate 44 and lower core support assembly 46 suitably attached to vessel 28 by welding or other connecting means. Assembly 46 comprises spaced apart plates 48 and 50 having a plurality of openings 60 and 62 respectively therethrough. The core is formed from an assemblage of fuel modules 24 having a hexagonal cross-section, as shown in FIG. 4, with movable and stationary regions 66 and 68. A cylindrical shroud 69 surrounds each of the movable regions 66 of fuel modules 24 and supports fuel rods (not shown) therein. The shroud 69 extends from openings 60 and 62 to the lower core support plate assembly 46, through the upper core support plate 44 and through-openings 70 in the pressure vessel 28 to the exterior thereof. The stationary region 68 is fixedly supported between plate 44 and assembly 46. A reactor control drive mechanism 80 is mounted on each of the shrouds 69 and serves to achieve individual axial movement of movable region 66 relative to the stationary regions 68 of the module 24.

Further details of a control mechanism suitable for this purpose are described in U.S. Pat. No. 3,296,081 issued to R. Wildgoose on Jan. 3, 1967 which illustrates the operation of a control mechanism capable of longitudinally locating the movable region 66. In this manner, variable geometry control of the reactor 20 is achieved. It is readily understood the modules 24 are designed having the least reactivity position when the movable regions 66 are at their lower most position, and the most positive reactivity position when the entire movable region 66 is directly adjacent to the stationary region 68.

Coolant is directed into opening 40 into a common plenum 82 formed between assembly plates 48 and 50, into openings 84 within shroud 69, through the movable region 66 and through openings 85 into the stationary regions 68, through openings 86 in plate 44 and openings 88 into plenum 90 and through nozzle 42.

Similarly, coolant is directed into openings 91 of the reflector assemblies 26.

The modules 24 having movable and stationary regions 66 and 68 may have various arrangements of fuel rod size and spacing of fissile and fertile material. Typical module arrangements may best be understood by the following Examples.

EXAMPLE I

Figure 5:
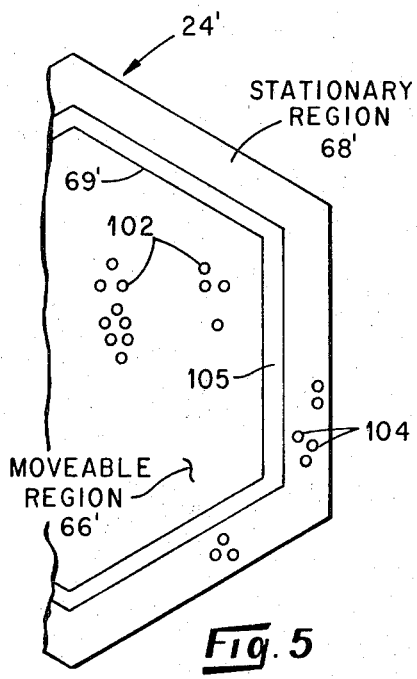
FIG. 5 is a schematic plane view of a reactor module utilizing a uniform lattice.
Figure 6:
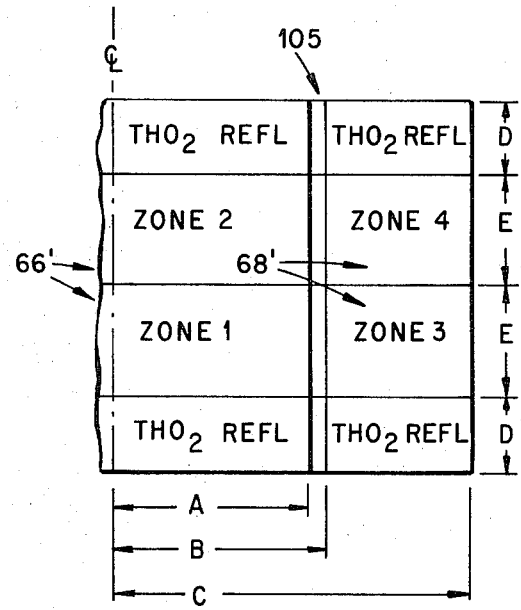
FIG. 6 is an elevation view of the reactor module of FIG. 5.

A uniform lattice module design utilizing uranium-233 fissile fuel and thorium fertile material is illustrated schematically in FIGS. 5 and 6 where only half the reactor module 24' is shown since the module 24' is symmetric. In this design a uniform rod lattice and uniform unit fissile and fertile fuel loading are provided throughout the movable and stationary fuel regions 66' and 68'. Structural regions are also schematically illustrated within the lattice to allow for proper support of fuel rods, and control mechanisms. The central hexagonally shaped movable region 66' comprises fuel rods 102 affixed to shroud 69' by suitable means as a grid structure (not shown). The stationary region 68' contains fuel rods 104. A region 105 comprising structural material and heavy water moderator is shown schematically between the respective movable and stationary regions 66' and 68'. Uranium oxide fissile fuel is varied in concentration in various zones provided within the modules 24' and shown schematically in FIG. 6. Typical design parameters and technical specifications are listed in TABLE II for a uniform lattice module using both large and small fuel rod designs. TABLE II refers to and should be used in conjunction with labels and reference letters shown in FIG. 6.

TABLE II

| DESIGN PARAMETERS | LARGE ROD DESIGN | SMALL ROD DESIGN |
|---|---|---|
| Rod OD (in.) | 0.500 | 0.300 |
| Clad Thickness (in.) | 0.039 | 0.024 |
| Fuel Pellet OD (in.) | 0.418 | 0.248 |
| Rod Spacing (in.) | 0.070 | 0.070 |
| Fuel Pellet % Theoretical Density | 0.900 | 0.900 |
| Weight % UO$_2$  Zone 1 | 11 | 12 |
| Zone 2 | 6 | 7 |
| Zone 3 | 6 | 7 |
| Zone 4 | 11 | 11 |
| Number of Rods (Kg.) | 894 | 2120 |
| U-233 Loading (Kg.) | 62.8 | 58.5 |
| Th-232 Loading (Kg.) | 1411 | 1173 |
| Power (MW Th) | 40.2 | 37.4 |
| M/F Atom Ratio | 1.5 | 2.4 |
| Distance A from Center of module to outer edge of movable fuel zone | | 14 cm. |
| Distance B from Center of module to outer edge of region 5 containing structural material and heavy water moderator | | 16 cm. |
| Distance C from Center of module to outer edge of stationary fuel zone | | 24 cm. |
| Thickness D of ThO$_2$ axial reflectors | | 1.5 ft. |
| Thickness E of zones 1, 2, 3 and 4 | | 2.0 ft. |

EXAMPLE II

Figure 7:
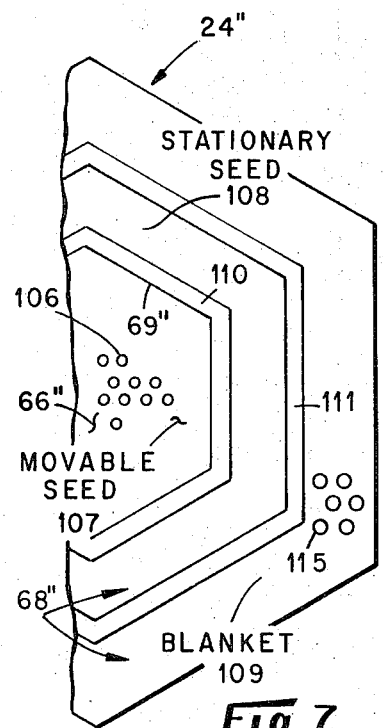
FIG. 7 is a schematic plane view of a reactor module utilizing a seed-blanket arrangement.
Figure 8:
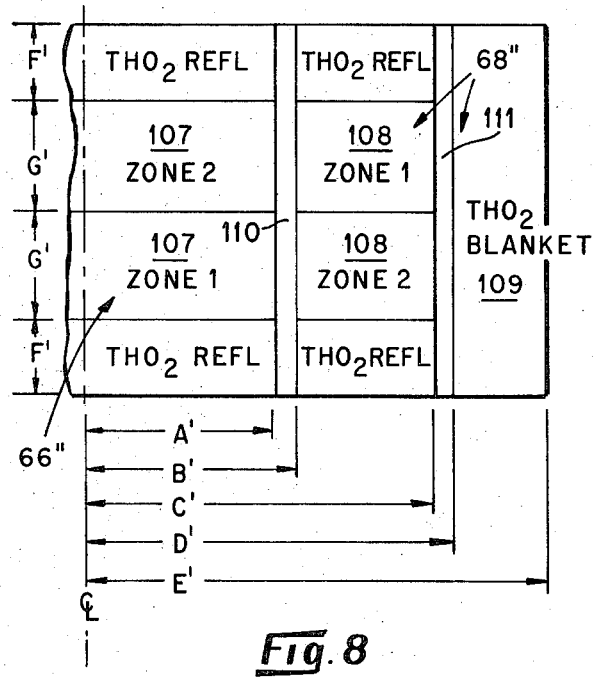
FIG. 8 is an elevation view of the reactor of FIG. 7.

A seed-blanket module design is illustrated in FIGS. 7 and 8. The basic seed-blanket module 24" uses small diameter rods 106 loaded with fissile and fertile material within the movable region 66" to comprise a central movable seed 107. The rods 106 are affixed to shroud 69" by a grid structure (not shown) or other suitable means. The stationary region 68" surrounding the movable seed 107 comprises stationary seed 108 having small diameter rods 106 and a blanket 109 having larger diameters rods loaded with fertile material. Regions 110 and 111 containing structural material and heavy water moderator are shown respectively schematically between the movable and stationary seed 107 and 108 and the stationary seed and blanket 108 and 109. An advantage of the seed-blanket arrangement is the ability to dispose larger rods with a corresponding harder or faster neutron spectrum in the blanket region without exceeding the fuel element temperature limits in that region. Typically seed rod diameters range from 0.250 to 0.499 inches and blanket rods range from 0.500 to 0.650 inches. Although larger diameter rods are most difficult to cool, less heat generation takes place therein in the absence of fissile fuel.

Typical design parameters and technical specifications for a seed-blanket module design are listed in the following TABLE III which refers to and should be used in conjunction with labels and reference letters shown in FIG. 8.

TABLE III

| DESIGN PARAMETERS | SEED | BLANKET |
|---|---|---|
| Rod OD (in.) | 0.250 | 0.650 |
| Clad Thickness (in.) | 0.020 | 0.028 |
| Pellet OD (in.) | 0.206 | 0.590 |
| Rod Spacing (in.) | 0.078 | 0.095 |
| Pellet % Theoretical Density | 0.85 | 0.95 |
| Weight % $UO_2$ Zone 1 | 22 | — |
| Zone 2 | 18 | — |
| Number of Rods | 1298 | 273 |
| U-233 Loading (Kg.) | 63.1 | 0.0 |
| Th-232 Loading (Kg.) | 445 | 667 |
| Power (MW Th) | 40.4 | |
| M/F Atom Ratio | 3.4 | 1.26 |
| Distance A' from center of module to outer edge of movable fuel seed region | 9.5 cm. | |
| Distance B' from center of module to outer edge of region 10 containing structural material and heavy water moderator | 11 cm. | |
| Distance C' from center of module to outer edge of stationary fuel seed region | 16 cm. | |
| Distance D' from center of module to outer edge of region 11 containing structural material and heavy water moderator | 17.5 cm. | |
| Distance E' from center of module to outer edge of blanket region 9 | 24 cm. | |
| Thickness F' of $ThO_2$ axial reflector | 1.5 ft. | |
| Thickness G' of zones 1 and 2 | 2.0 ft. | |

As illustrated above, Examples I and II describe specific representative modules having regions with $M/F$ atom ratios ranging from 3.4 to 1.26. Referring again to FIG. 2, it is noted by reducing the rod spacing for a 0.500 inch diameter rod in the uniform lattice module from 0.070 inches to 0.050 inches results in a $M/F$ atom ratio of about 1.0. Thus, it is apparent increases or decreases in the rod diameter or rod spacing, separately or in combination, in either module shown in Example I and II can readily define module structures having an $M/F$ atom ratio from 3.5 to 1.0.

Examples I and II also illustrate specific $UO_2$ weight percents for the core zones, and particularly uniform lattice $UO_2$ weight percent values of 11 to 12 for zone 1, 6 and 7 for zones 2 and 3, and 11 for zone 4 for the 0.300 and 0.500 inch diameter rods respectively, and seed blanket $UO_2$ weight percent values of 22 for seed zone 1 and 18 for seed zone 2. It is apparent that the above $UO_2$ weight percentages would vary as rod diameter and spacing were varied. Typically, ranges of $UO_2$ weight percentages for uniform lattice modules would be from about 9 to about 14 for zones 1 and 4 and from about 4 to about 8 for zones 2 and 3. The seed-blanket modules would have $UO_2$ weight percentages ranging from about 18 to about 25 for seed zone 1 and from about 15 to about 22 for seed zone 2.

Figure 9:
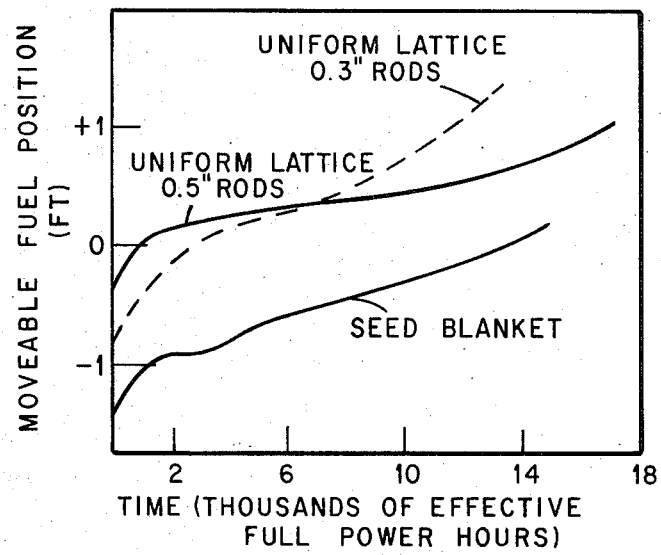
FIG. 9 is a graph illustrating critical fuel position of the movable fuel for a reactor using both the uniform lattice and seed-blanket modules.

Variable geometry control of the above described module designs is utilized because of the good neutron economy which is characteristic of that type of control. Depletion results (fuel position vs. time) for a reactor using uniform lattice and seed blanket modules are shown in FIG. 9. The control swing with reactor lifetime which can be seen in FIG. 9 indicates that control using neutron poisons would result in an undesirable loss of neutrons even though such a scheme is practicable.

Table IV represents estimated thermal and hydraulic data for both the uniform lattice and seed blanket module designs. As previously noted, sufficient flow rates for rod diameters and spacing defining a $M/F$ atom ratio in the scope of the present invention may be achieved to provide adequate fuel rod cooling.

TABLE IV

THERMAL AND HYDRAULIC MODULE DATA

FOR 640 KW/Kg

| | UNIFORM LATTICE MODULE | | SEED BLANKET MODULE | |
|---|---|---|---|---|
| | 0.5" | .3" | Seed | Blanket |
| Core Height (ft.) | 7.0 | 7.0 | 7.0 | 7.0 |
| Hydraulic Dia. (in.) | .217 | .203 | .202 | — |
| Module Flowrate (M/Hr) | 2.11 | 1.96 | 2.37 | |
| Flow Area (ft²) | .527 | .705 | .319 | .282 |
| Mass Velocity (M/Hr. ft²) | 4.00 | 2.78 | 6.52 | 1.04 |
| Relative ΔP | 1.76 | 0.90 | 1.0 | — |
| Relative Core Pumping Power (1.0 Standard) | 2.0 | 1.0 | 8.62 | |

Figure 10:
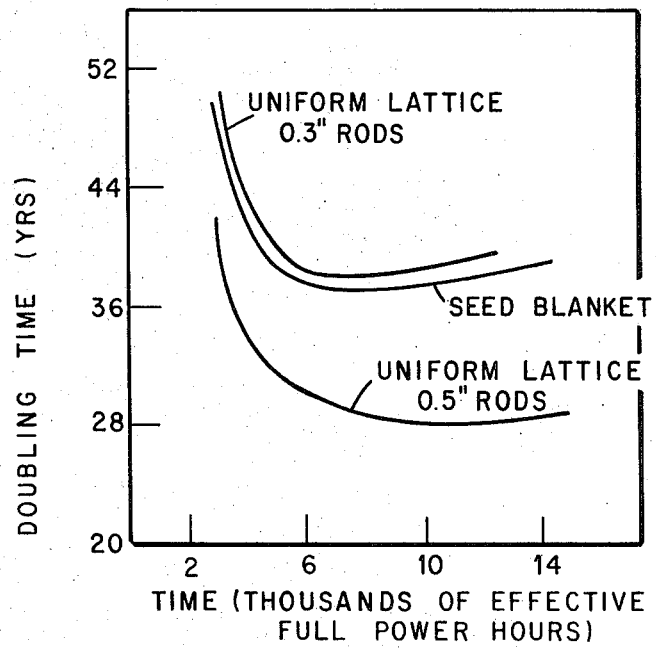
FIG. 10 is a graph showing doubling time as a function of reactor operating time at full power for a reactor using both the uniform lattice and seed-blanket modules.

FIG. 10 shows reactor doubling times as a function of effective fuel power hours for both the uniform lattice and seed-blanket module designs. It can be seen from FIG. 10 that the uniform lattice module design with the larger diameter fuel rods has considerably shorter doubling times than the uniform lattice module design with small diameter rods. Although minimum doubling times are achieved at about 10,000 effective fuel power hours only small increases in doubling times occur as lifetimes are increased to 16,000 or more full power hours. Slightly longer doubling times with longer lifetimes are economically justified because of the lower fuel costs associated with longer fuel lifetimes.

A comparative neutron balance and conversion rate at 11,000 Effective Full Power Hours (EFPH) for reactors using both uniform lattice and the seed-blanket modules is shown in TABLE V.

TABLE V

COMPARATIVE NEUTRON BALANCE AND CONVERSION RATE AT 11,000 EFFECTIVE FULL HOURS FOR UNIFORM LATTICE AND SEED BLANKET REACTOR MODULES

|   |   | UNIFORM LATTICE 0.5" Rod | UNIFORM LATTICE 0.3" Rod | SEED BLANKET |
|---|---|---|---|---|
|   | TIME (EFPH) | 11,000 | 11,000 | 11,000 |
| 1. | ABSORPTIONS |   |   |   |
|   | LEAKAGE | .010 | .010 | .010 |
|   | DEUT, OXYGEN | .005 | .009 | .009 |
|   | ZIRC NI | .044 | .045 | .046 |
|   | TH232 | .480 | .464 | .466 |
|   | PA233 | .006 | .008 | .006 |
|   | U-233 | .413 | .416 | .415 |
|   | U-234 | .009 | .012 | .011 |
|   | F.P. INCL. XE135 | .033 | .036 | .037 |
|   | TOTAL | 1.000 | 1.000 | 1.000 |
| 2. | PRODUCTIONS |   |   |   |
|   | TH232  PA233 | .026 | .030 | .031 |
|   | U-233 | .968 | .960 | .960 |
|   | U-234 | .003 | .003 | .003 |
|   | DEUT | .003 | .007 | .006 |
|   | TOTAL | 1.000 | 1.000 | 1.000 |
|   | FFERT/TOTAL | .010 | .012 | .012 |
|   | ETA | 2.343 | 2.307 | 2.312 |
|   | EPSILON | 1.022 | 1.029 | 1.029 |
|   | ETA*EPSILON | 2.395 | 2.374 | 2.379 |
|   | 1/A(FISS) | 2.420 | 2.402 | 2.409 |
| 3. | CR LOSSES |   |   |   |
|   | D,O,ZR,NI | .118 | .129 | .133 |
|   | PA233 | .029 | .038 | .031 |
|   | F.P. | .080 | .087 | .089 |
|   | TOTAL | .227 | .254 | .253 |
|   | CR | 1.144 | 1.096 | 1.102 |
|   | FIR | 1.059 | 1.045 | 1.046 |

This Table clearly illustrates the improvement over prior art deuterium converter reactors in operating at a $M/F$ atom ratio between 0.35 to 4 and particularly noteworthy is the low fission product (F.P.) absorptions. Finally, it should be noted that since heavy water is used as the moderator and coolant, the term $M/F$ atom ratio could also be expressed as deuterium-to-fuel atom ratio.

The preceeding description of a reactor design having a plurality of modules was offered for illustrative purposes of the inventive moderator-to-fuel atom ratio only, and should not be interpreted in a limiting sense. For example, various rod type fuel element configurations may be used without departing from the scope of the invention. Various fuel materials including the metal, oxide, and carbide forms of uranium, plutonium and thorium are useful. It is intended rather that the invention be limited only by the claims appended hereto.

What we claim is:

1. In a pressurized heavy water moderated and cooled epithermal nuclear breeder reactor comprising an active core having a plurality of fuel modules containing fissile and fertile material, said modules including movable and stationary regions each of said regions having fuel rods containing said fissile and fertile material, each of said stationary regions surrounding one of said movable regions; means for axially positioning said movable regions whereby said reactor reactivity is controlled by variable geometry control, said fissile and fertile material respectively selected from uranium-233 and thorium-232 and having a fertile to fissile atom ratio in the range from 5 to 50; and a reflector surrounding the fissile and fertile material, the improvement comprising said active core having a moderator-to-fuel atom ratio in the range from 3.5 to 1.00, each of said movable and stationary module regions arranged into a uniform rod lattice with uniform fissile and fertile fuel loading and divided into first and second axially aligned zones, said first movable zone aligned adjacent to the first stationary zone, said first movable zone and said second stationary zone having a weight percent $UO_2$ different from that of said second movable and first stationary zones, said first movable and second stationary zones having from about 9 to about 14 weight percent $UO_2$ and said second movable and first stationary zones having from about 4 to about 8 weight percent $UO_2$, said fuel rods ranging in diameter from 0.250 to about 0.500 inches, said rods having a triangular pitch array with a rod spacing from 0.055 to 0.095 inches.

2. In a pressurized heavy water moderated and cooled epithermal nuclear breeder reactor comprising an active core having a plurality of fuel modules containing fissile and fertile material, said modules including movable and stationary regions, each of said regions having fuel rods containing said fissile and fertile material, each of said stationary regions surrounding one of said movable regions; means for axially positioning said movable regions whereby said reactor reactivity is controlled by variable geometry control, said fissile and fertile material respectively selected from uranium-233 and thorium-232 and having a fertile to fissile atom ratio in the range from 5 to 50; and a reflector surrounding the fissile and fertile material, the improvement comprising said active core having a moderator-to-fuel atom ratio in the range from 3.5 to 1.00, each movable region comprises an array of fuel rods defining a movable seed region and each stationary region comprises an array of fuel rods defining a stationary seed region and a stationary blanket region of Th232, said stationary seed region surrounding said movable seed region and said blanket region surrounding said stationary seed region, said movable and stationary seeds are divided into first and second axially aligned zones, said first movable seed zone aligned adjacent to said secondary seed zone, said first and second seed zones haveng different weight percent $UO_2$, said first seed zones have from about 20 to about 25 weight percent $UO_2$ and said second seed zones having from about 15 to about 19 weight percent $UO_2$, said movable seed and stationary seed fuel rods having a rod diameter from 0.250 to 0.499 inches and the blanket fuel rods having a rod diameter from 0.500 to 0.650 inches, all of said fuel rods having a triangular pitch array with a rod spacing from 0.055 to 0.095 inches.

* * * * *